United States Patent
Eble

(10) Patent No.: US 11,288,873 B1
(45) Date of Patent: Mar. 29, 2022

(54) BLUR PREDICTION FOR HEAD MOUNTED DEVICES

(71) Applicant: Apple Inc., Cupertino, CA (US)

(72) Inventor: Tobias Eble, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/868,819

(22) Filed: May 7, 2020

Related U.S. Application Data

(60) Provisional application No. 62/850,628, filed on May 21, 2019.

(51) Int. Cl.
*G06T 19/00* (2011.01)
*G06F 3/01* (2006.01)

(52) U.S. Cl.
CPC ............ *G06T 19/006* (2013.01); *G06F 3/013* (2013.01); *G06T 2210/36* (2013.01)

(58) Field of Classification Search
CPC .... G06T 19/006; G06T 2210/36; G06F 3/013
See application file for complete search history.

(56) References Cited

U.S. PATENT DOCUMENTS

| | | | |
|---|---|---|---|
| 9,364,142 B2 | 6/2016 | Hatanaka et al. | |
| 10,261,579 B2 | 4/2019 | Wang et al. | |
| 10,664,953 B1* | 5/2020 | Lanman | G02B 27/017 |
| 2013/0257908 A1* | 10/2013 | Ota | G06T 19/006 |
| | | | 345/633 |
| 2016/0267720 A1 | 9/2016 | Mandella et al. | |
| 2017/0024933 A1* | 1/2017 | Shuster | B60K 35/00 |
| 2017/0102545 A1 | 4/2017 | Hua et al. | |
| 2018/0176483 A1* | 6/2018 | Knorr | H04N 5/2723 |
| 2020/0065941 A1* | 2/2020 | McGuire | G06F 3/011 |

* cited by examiner

*Primary Examiner* — Chong Wu
(74) *Attorney, Agent, or Firm* — Thompson Hine LLP

(57) ABSTRACT

Various implementations provided herein provide a computer-generated reality (CGR) experience on a head mounted device (HMD) that includes intentionally blurring virtual content to provide a more natural user experience. For example, while the user is focused on an object 10 feet away, a virtual object 3 feet away that is not focused upon but still visible may be intentionally blurred so that it does not appear crisp. The blurring depends on the distance of what the user is focusing on and the distance of the virtual object that the user is not focusing on. The CGR environment may involve virtual reality, mixed reality, optical see through, or video pass through.

21 Claims, 7 Drawing Sheets

BLUR PREDICTION FOR HEAD MOUNTED DEVICES

CROSS-REFERENCE TO RELATED APPLICATIONS

This application claims the benefit of U.S. Provisional Application Ser. No. 62/850,628 filed May 21, 2019, which is incorporated herein in its entirety.

TECHNICAL FIELD

The present disclosure generally relates to providing content on electronic devices, and in particular, to systems, methods, and devices for providing content based on blur predictions.

BACKGROUND

When a person visually focuses on an object that is a distance away from the person, objects at other distances naturally appear blurry to the user. For example, if a user focuses on a tree that is ten feet away from the user's eye, a coffee cup that is three feet away from the user's eye that is not focused on will typically appear blurry to the user. In the context of head-mounted devices (HMDs), content presented on the display of the HMD may not have this natural and expected blurred appearance. A user focusing on a virtual tree that is depicted as being 10 feet away may see a virtual coffee cup that is depicted as being three feet away as being clear rather than blurry. Existing systems and techniques do not adequately account for the natural blurring expected by HMD users.

Another problem arising in the context of optical see through HMDs relates to the virtual objects appearing too bright or transparent because of the light reflected from objects in the physical environment that may pass through the transparent display and combine with the light of the virtual object. Attempts to address this problem have involved using a blocking layer on HMDs that selectively block the physical environment light behind the virtual objects. However, existing techniques have failed to adequately account for the blurring and empty spaces that often appear to the user around the virtual objects with such selective blocking.

SUMMARY

As discussed above, existing systems and techniques do not adequately account for the natural blurring expected by HMD users. Some implementations provided herein provide a computer-generated reality (CGR) experience on a head mounted device (HMD) that includes intentionally blurring virtual content to provide a more natural user experience. For example, while the user is focused on an object 10 feet away, a virtual object 3 feet away that is not focused upon but still visible may be intentionally blurred so that it does not appear crisp. The blurring depends on the distance of what the user is focusing on and the distance of the virtual object that the user is not focusing on. The CGR environment may involve virtual reality, mixed reality, optical see through, or video pass through.

In some implementations, an electronic device uses a processor to perform a method. The method involves determining a first distance between a user and first content that the user is focusing on in a CGR environment. For example, this may involve determining based on the user's eye characteristics, gaze direction, or interactions that user is focusing on a real or virtual object that is 10 feet away from the user's eye. The distance of a virtual object may be known based on the known 3D geometry of the world and the user's position within it. The distance of a real object may be estimated, as examples, by measuring the eye (e.g., the shape of the lens of the eye), determining a convergence point of gaze directions of both eyes, or determining a 3D construction of the room and determining which content within it the user is focused on based on gaze direction.

The method further determining a second distance between the user and second content. The second content includes virtual content, such as a virtual coffee cup, to be included in the CGR environment. The virtual content will be displayed on a display of the HMD in a way that it appears to be at the second distance to the user's eye (e.g., based on eye convergence). The method blurs the second content (e.g., the virtual coffee cup) based on the first distance and the second distance. In some implementations, the blur is based on determining a circle of confusion (e.g., a blur spot) based on the first and second distances and an aperture (e.g., pupil radius). The blurred second content is presented in the CGR environment. Accordingly, while the user is focusing on the first content, the second content is presented with a naturally blurred appearance.

Some implementations address the issue in optical see through-based CGR environments with virtual objects appearing too bright or transparent because of the light reflected from objects in the physical environment that may pass through the transparent display and combine with the light of the virtual objects. Some implementations provide selective blocking (e.g. local dimming) using a blocking layer based on blur predictions. In some implementations, the content or the light blocking is configured to account for blurriness associated with the blocking layer that is relatively close to the user's eye. The blurriness of the blocking layer may be predicted based on the distance of what the user is focusing on and the distance of the blocking layer from the user's eye.

In some implementations, an electronic device uses a processor to perform a method. The method involves determining a first distance between a user and first content that the user is focusing on in a CGR environment. The first content may be presented on a display layer (e.g., virtual content) or through the display layer (e.g., physical setting content) of the HMD. The method also determines a second distance between the user and a blocking layer of the HMD. The blocking layer is configured to selectively block light from a physical environment. In some implementations, the distance of the blocking layer from the eye is identified or otherwise known based on the HMD configuration. In some implementations, the distance is determined using an image of the eye.

The method determines a blur associated with the blocking layer based on the first distance and the second distance. For example, the distances and aperture (e.g., pupil radius) may be used to determine a circle of confusion (e.g., a blur spot) that represents the blur associated one or more points on the blocking layer. The method presents the second content on a portion of the display layer of the HMD and controls the blocking layer to include a blocking portion to block light from the physical environment corresponding to the second content. The second content, the blocking portion, or both is configured based on the blur. For example, a virtual coffee cup may be displayed on the display while light from "behind" the coffee cup from the physical environment is blocked by a blocking portion having a similar size and shape. The second content or blocking portion is adjusted based on the blur to achieve particular advantages in different use cases. For example, to avoid too much spillover (e.g., too much blocking leading to the appearance of empty space/dark outlines), the second content may be adjusted in size to fill in the empty space or the blocking portion may be reduced in size. In another example, extra spillover may be intentionally added, for example, by adding extra blocking around virtual text to improve its readability. In another example, based on the blur prediction, a de-blurring algorithm may be performed to reduce blur caused by the blocking.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
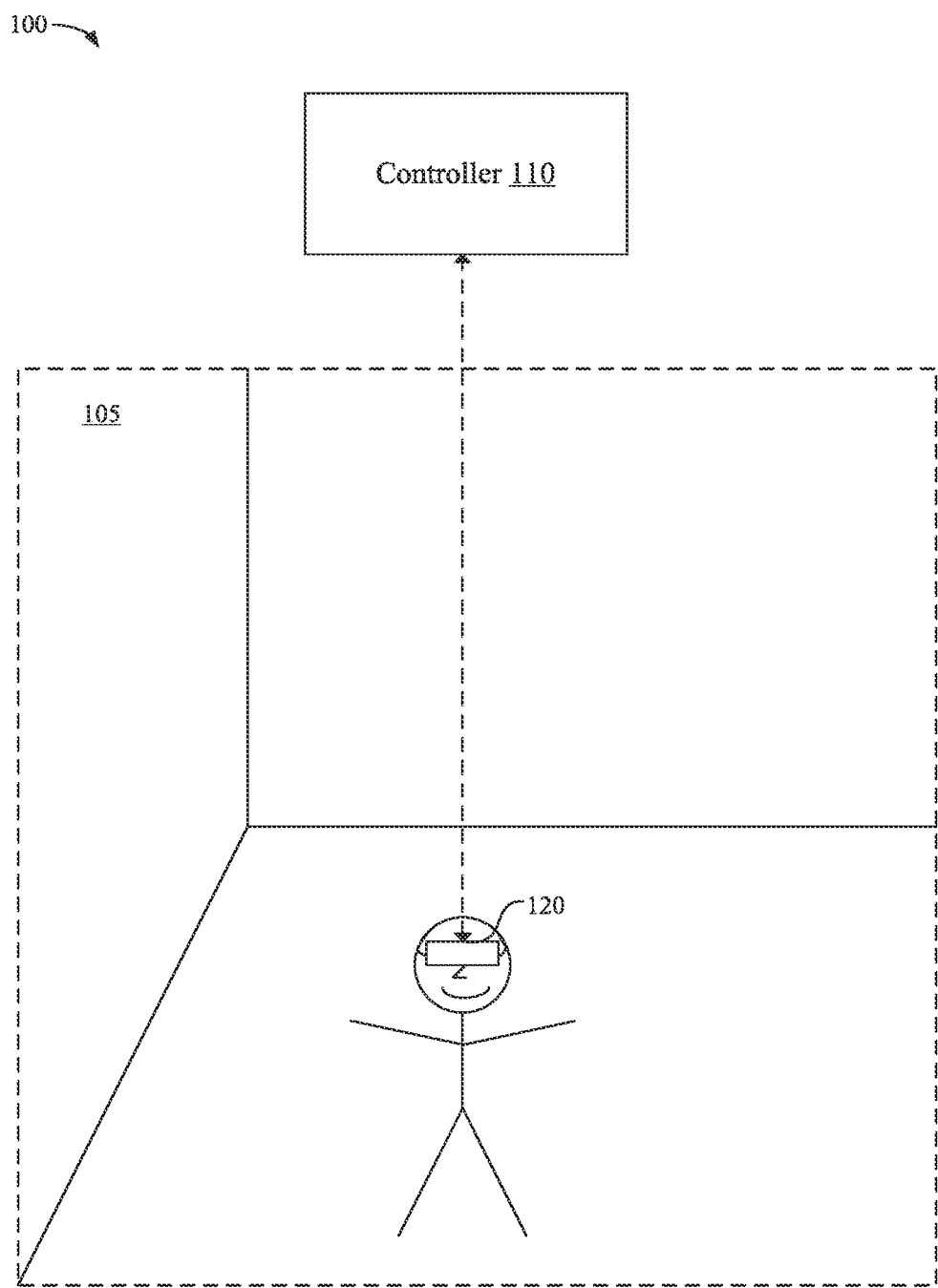
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
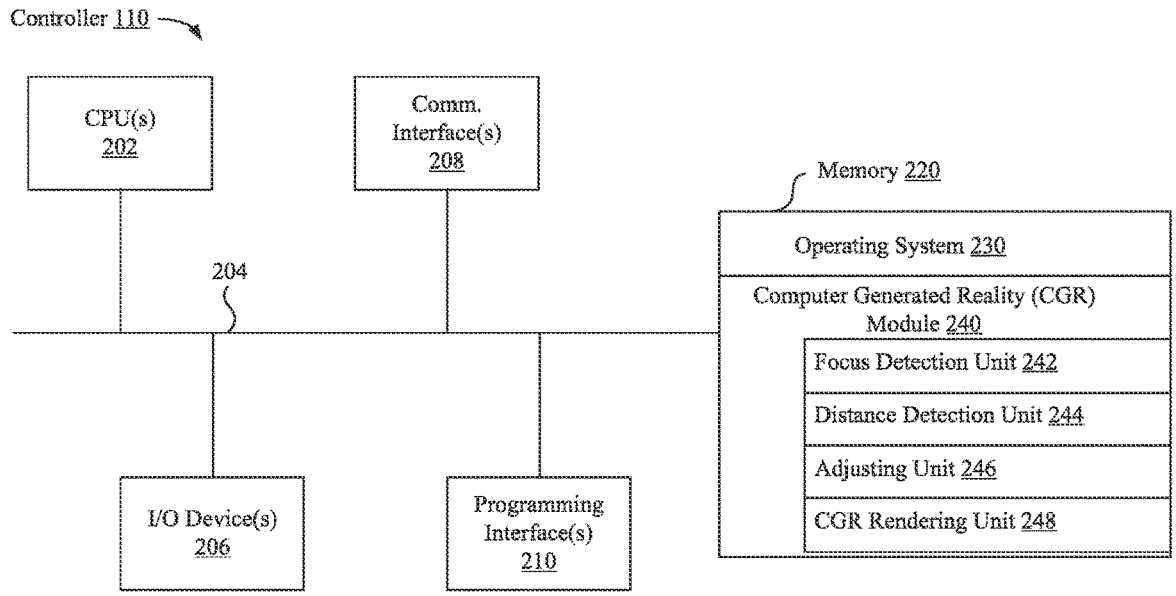
FIG. 2 is a block diagram of an example controller in accordance with some implementations.
Figure 3:
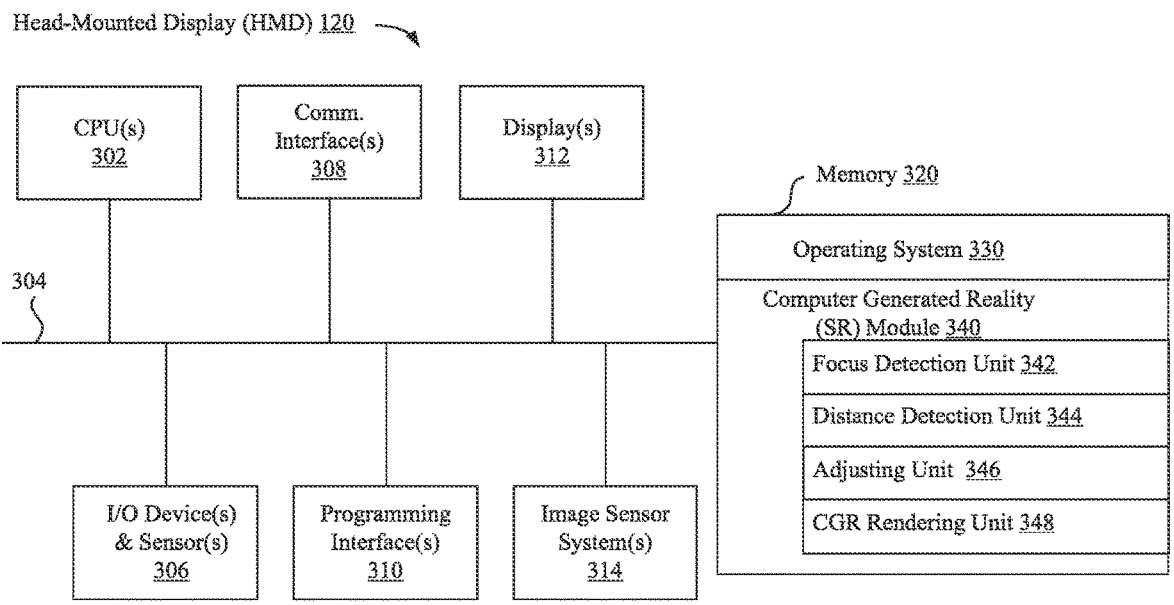
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present a CGR environment to the user. In some implementations, the HMD 120 includes a suitable combination of software, firmware, or hardware. The HMD 120 is described in greater detail below with respect to FIG. 3. In some implementations, the functionalities of the controller 110 are provided by or combined with the HMD 120, for example, in the case of an HMD that functions as a stand-alone unit.

According to some implementations, the HMD 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the computer-generated reality (CGR) module 240 includes a focus detection unit 242, a distance detection unit 244, and adjusting unit, and a CGR rendering unit. The focus detection unit 242 is configured to determine the focus of one or both eyes of a user, for example, based on characteristics of the user's eye(s), the direction of the user's gaze, or the content with which the user is interacting.

The distance detection unit 244 determines the distances of objects that the user is focusing on and objects that the user is not focusing on. For example, the distance detection unit 244 may determine that the user is focused on a virtual tree that is depicted in the CGR environment as if the tree were 10 feet away from the user's eye and determine that a coffee cup that the user is not focused on is depicted in the CGR environment as if the tree were 3 feet away from the user's eye.

The adjusting unit 246 is configured to change the appearance of objects in the CGR environment based on predicting the blur that the user would naturally experience in a real environment. In some implementations, the adjusting unit 246 predicts the blur based on the distances determined by the distance detection unit, such as the distance of objects from the user's eye and the aperture (e.g., iris opening size) of the user's eye.

The CGR rendering unit 248 presents the CGR environment using the appearance of objects adjusted by the adjusting unit 246. In some implementations, the CGR rendering unit 248 presents a sequence of frames on a display of an HMD in which each frame includes blur-based adjustments of objects that the user in not focused on based on what the object that the user is focused on. Thus, over time as the user's focus changes from near to far objects and from far to near objects, the appearance of other objects in the CGR environment changes accordingly to provide appropriate blurring. Similarly, as an object moves closer to or further away from the user, the appearance will change to provide appropriate blurring.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks.

In some implementations, the computer-generated reality (CGR) module 340 includes a focus detection unit 342, a distance detection unit 344, and adjusting unit, and a CGR rendering unit. The focus detection unit 342 is configured to determine the focus of one or both eyes of a user, for example, based on characteristics of the user's eye(s), the direction of the user's gaze, or the content with which the user is interacting.

The distance detection unit 344 determines the distances of objects that the user is focusing on and objects that the user is not focusing on. For example, the distance detection unit 344 may determine that the user is focused on a virtual tree that is depicted in the CGR environment as if the tree were 10 feet away from the user's eye and determine that a coffee cup that the user is not focused on is depicted in the CGR environment as if the tree were 3 feet away from the user's eye.

The adjusting unit 346 is configured to change the appearance of objects in the CGR environment based on predicting the blur that the user would naturally experience in a real environment. In some implementations, the adjusting unit 346 predicts the blur based on the distances determined by the distance detection unit, such as the distance of objects from the user's eye and the aperture (e.g., iris opening size) of the user's eye.

The CGR rendering unit 348 presents the CGR environment using the appearance of objects adjusted by the adjusting unit 346. In some implementations, the CGR rendering unit 348 presents a sequence of frames on a display of an HMD in which each frame includes blur-based adjustments of objects that the user in not focused on based on what the object that the user is focused on. Thus, over time as the user's focus changes from near to far objects and from far to near objects, the appearance of other objects in the CGR environment changes accordingly to provide appropriate blurring. Similarly, as an object moves closer to or further away from the user, the appearance will change to provide appropriate blurring.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
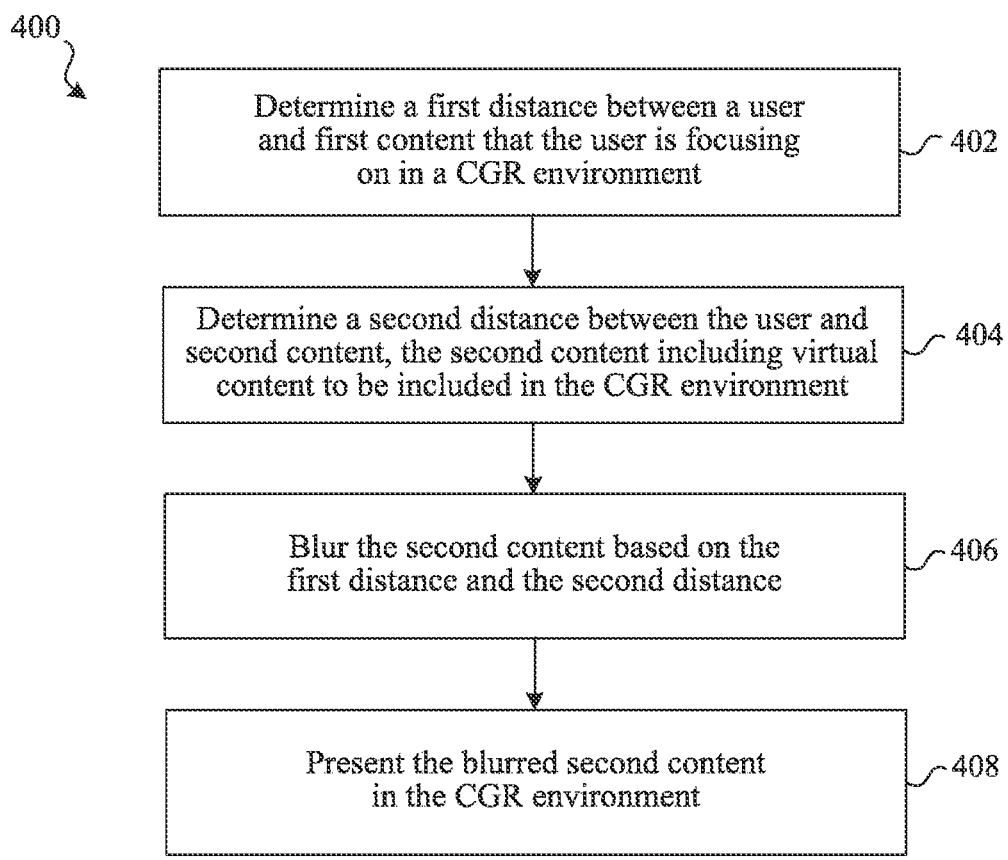
FIG. 4 is a flowchart illustrating an exemplary method for providing a computer-generated reality experience on an HMD that includes intentionally blurred virtual content, according to some implementations.

FIG. 4 is a flowchart illustrating an exemplary method for providing a CGR experience on an HMD that includes intentionally blurred virtual content. In some implementations, the method 400 is performed by a device (e.g., controller 100 or HMD 120 of FIGS. 1-3). The method 400 can be performed at a mobile device, head mounted device (HMD), desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 involves determining a first distance between a user and first content that the user is focusing on in a CGR environment. For example, this may involve detecting that the user is focusing on a real or virtual object that is 10 feet away from the user's eye. The distance of a virtual object may be known based on the known 3D geometry of the world and the user's position within it. The distance of a real object of the physical environment may be estimated by measuring the eye (e.g., the shape of the lens of the eye) or determining a convergence point of gaze directions of both eyes. The distance of a real object of the physical environment may be determined by determining a 3D construction of the room and determining which content within it the user is focused on based on gaze direction. In some implementations, this involves generating a three dimensional (3D) construction of the CGR environment and identifying the first content within the 3D construction based on a gaze direction of the eye. The distance of the first content from the user's eye in the 3D world space can then be determined.

Note that real and virtual objects may be displayed on a display of a HMD and thus may actually be only a short distance from the user's eye. However, the objects may be displayed on the display such that they will appear to be at certain distances, e.g., a virtual tree may be displayed on the display(s) that is only an inch in front of the user's eyes but appear to be 10 feet away. Lenses in the HMD may be used to facilitate the appearance of objects at desired distances. Displaying the content to account for convergence of a user's two eyes may also facilitate the appearance of objects at desired distances. The method may account for HMD lenses, content display characteristics, eye convergence, and any other relevant factors in determining the distance of the object upon which the user is focusing, e.g., how far the object appears to be away from the user's eye.

The CGR environment of method 400 may be a virtual reality (VR) environment or a mixed reality (MR) environment. The HMD of method 400 may be an optical see through HMD or a video pass through HMD.

At block 404, the method 400 involves determining a second distance between the user and second content, the second content including virtual content to be included in the CGR environment. The distance of the second object is how far the second object will appear to be from the user rather than the distance to the display screen where the object is displayed, e.g., the distance of a virtual coffee cup may be 3 feet in front of the user even though it is displayed on a screen 1 inch in front of the user's eye. The system may determine the distances of particular virtual objects or parts of objects (e.g., each pixel, each group of pixels of a predetermined size, etc.) that will be displayed for the CGR environment and determine their distances from the user's eye. This information may be known or determined based the 3D coordinates of the objects and the 3D coordinates of the user's eye, e.g., in real or virtual world space.

At block 406, the method 400 involves blurring the second content based on the first distance and the second distance and, at block 408, presenting the blurred second content in the CGR environment. In some implementations, the content is blurred based on determining a representation of the blur such as a circle of confusion or blur spot. A circle of confusion may be determined based on the first and second distances and the aperture (e.g., the radius of the user's pupil). The amount of blurring may mimic the natural or real amount of blurring that the user would naturally experience, e.g., when viewing objects at real distances rather than on an HMD display. The blurring may be determined for multiple second content objects (e.g., for everything in the CGR environment that the user is not focusing one). The second content may be a pixel or groups of pixels. The amount of blurring will generally depend (e.g., based on a distance-dependent blurring formula) on the difference in distance between what the user is focusing on and the particular second object. When the user is focused on a tree ten feet away, the dog 3 feet away will be blurred less than the finger that is 6 inches away. This is consistent with the user's natural expectations of blur.

Figure 5:
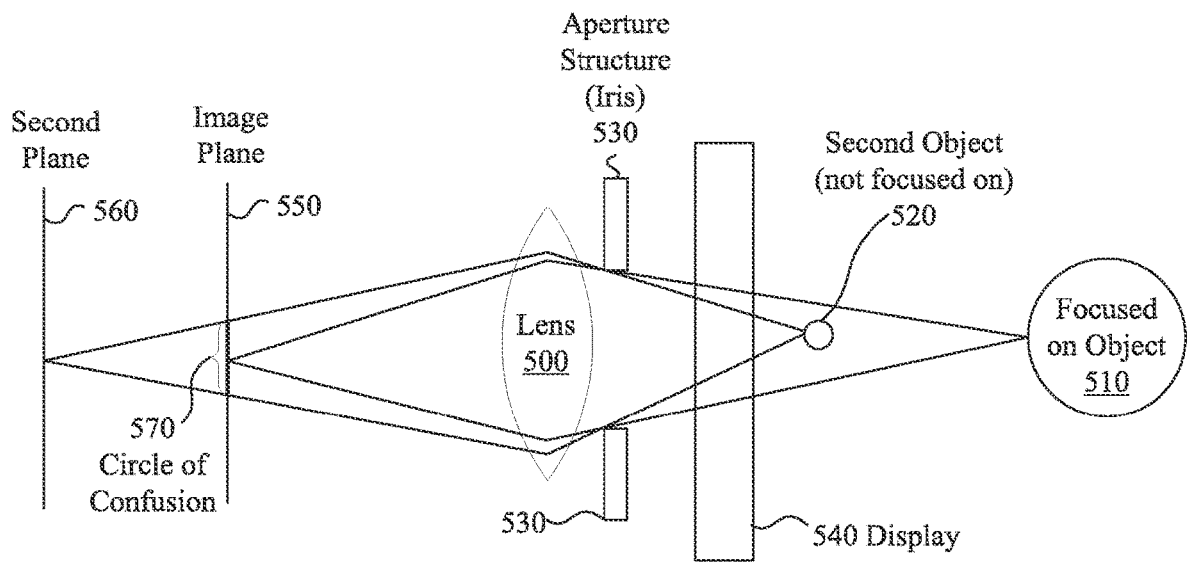
FIG. 5 is a block diagram illustrating an eye observing several objects at different distances.

FIG. 5 is a block diagram illustrating an eye observing several objects at different distances. In this example the eye includes a lens 500 that focuses the eye on focused on object 510. Light reflected from the focused on object 510 passes through the aperture structure (e.g., the iris) where it encounters the lens and is focused on image plane 550. The focused on object 510 may actually be displayed on display 540 in a way that it appears to be at the location of the focused on object 510.

FIG. 5 also includes a second object 520 that the lens 500 is not focusing on. In this example, the focus plane (i.e., second plane 560) associated with the second object 510 would be behind the image plane 550 that the user's cognitive system recognizes. Accordingly, light reflected from the second object 520 through the aperture structure 530 would be focused by lens 500 into the circle of confusion 570 area on the image plane 550. Light from a point on the second object 520 would be spread over the circle of confusion 570 rather than appearing as a point—the point would and should appear blurry to the user. However, second object 520 (if unaltered) may be displayed on the display 540 in a way such that is not appear blurry (e.g., is focused to a point rather than a circle of confusion on the image plane 550). This may appear unnatural to the user. Some implementations, determine a circle of confusion 570 that should be associated with a second object 520 and display that second object using display 540 based on that predicted blur to provide a more natural or otherwise more desirable user experience.

Figure 6:
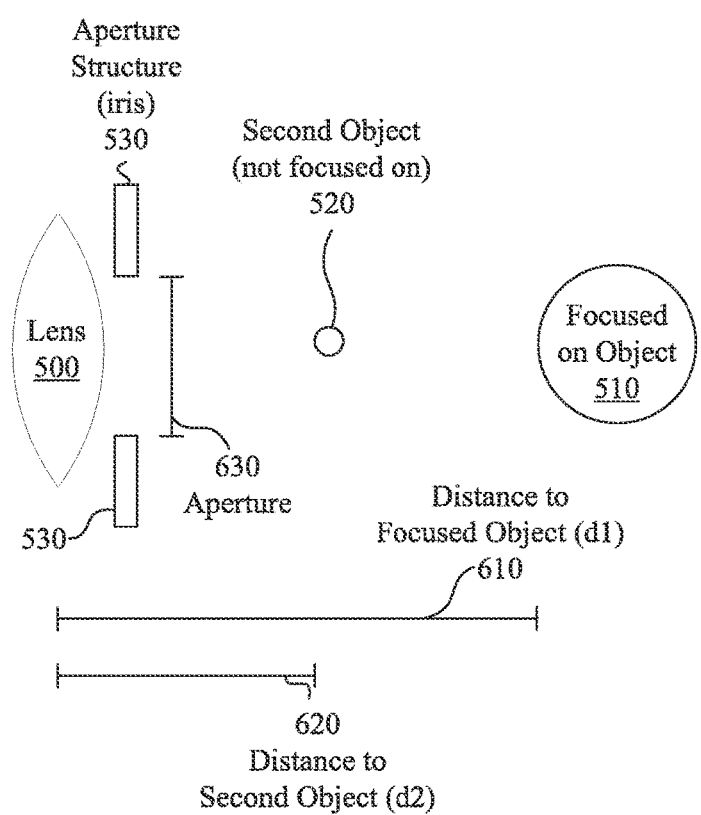
FIG. 6 is a block diagram illustrating distances between elements of FIG. 5.

FIG. 6 is a block diagram illustrating distances between the elements of FIG. 5. Specifically, FIG. 6 illustrates the distance to the focused object ($d_1$) 610, the distance to the second object ($d_2$) 620 and the aperture 630, which in this example could correspond to the radius of the user's pupil. In some implementations, these values are used to predict the blur that the second object 520 should have. In some implementations, a circle of confusion is determined using the following formula:

$$C = a|1/d_1 - 1/d_2|$$

where a is aperture and C is circle of confusion.

Figure 7:
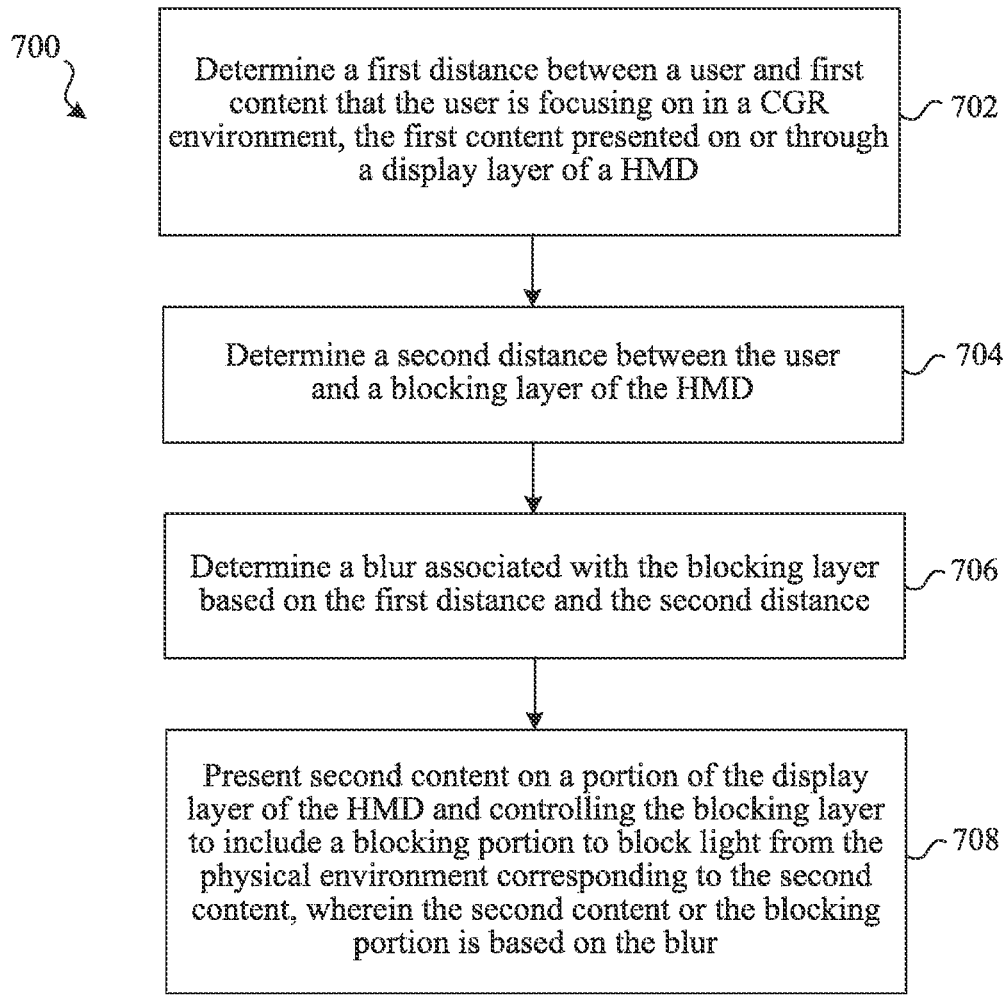
FIG. 7 is a flowchart illustrating an exemplary method for providing a CGR environment on an optical see through HMD using selective blocking based on blur prediction.

FIG. 7 is a flowchart illustrating an exemplary method for providing a CGR environment on an optical see through HMD using selective blocking based on blur predictions. In some implementations, the method 700 is performed by a device (e.g., controller 100 or HMD 120 of FIGS. 1-3). The method 700 can be performed at a mobile device, head mounted device (HMD), desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 702, the method 700 involves determining a first distance between a user and first content that the user is focusing on in a CGR environment. The first content is presented on or through a display layer of the HMD, e.g., on an optical see through HMD. The determining may involve detecting that the user is focusing on a real or virtual object that is 10 feet away from the user's eye. The distance of a virtual object may be known based on the known 3D geometry of the world and the user's position within it. The distance of a real object of the physical environment may be estimated by measuring the eye (e.g., the shape of the lens of the eye) or determining a convergence point of gaze directions of both eyes. The distance of a real object of the physical environment may be determined by determining a 3D construction of the room and determining which content within it the user is focused on based on gaze direction. In some implementations, this involves generating a three dimensional (3D) construction of the CGR environment and identifying the first content within the 3D construction based on a gaze direction of the eye. The distance of the first content from the user's eye in the 3D world space can then be determined.

Note that real and virtual objects may be displayed on a display of a HMD and thus have an actual distance from the user's eye. However, the objects may be displayed on the display such that they will appear to be at certain distances, e.g., a virtual tree may be displayed on the display(s) that is only an inch in front of the user's eyes but appear to be 10 feet away. Lenses in the HMD may be used facilitate the appearance of objects at desired distances. Displaying the content to account for convergence of a user's two eyes may also facilitate the appearance of objects at desired distances. The method may account for HMD lenses, content display characteristics, eye convergence, and any other relevant factors in determining the distance of the object upon which the user is focusing.

At block 704, the method 700 involves determining a second distance between the user and a blocking layer of the HMD. For example, the distance of the blocking layer from the eye may be identified from the HMD configuration or detected using an image of the eye.

At block 706, the method 700 involves determining a blur associated with the blocking layer based on the first distance and the second distance. In some implementations, the distances and an aperture (e.g., pupil radius) may be used to determine a circle of confusion (e.g., a blur spot) that represents the blur associated one or more points on the blocking layer.

At block 708, the method 700 involves presenting second content on a portion of the display layer of the HMD and controlling the blocking layer to include a blocking portion to block light from the physical environment corresponding to the second content. The second content or the blocking portion is based on the blur. For example, a virtual vase may be displayed on a display layer an inch from the user's eye and light from "behind" the vase from the physical environment may be blocked by an activated portion of a blocking layer having a similar size and shape. A blocking portion may be adjusted in size or shape based on the blur to avoid or reduce blocking that results in an empty area. In other implementations, a blocking portion is adjusted based on the blur to increase an empty area surrounding the second content.

The second content or blocking portion is adjusted based on the blur to achieve particular advantages in different use cases and circumstances. For example, to avoid too much spillover (e.g., too much blocking leading to the appearance of empty space/dark outlines), the second content may be adjusted in size to fill in the empty space or the blocking portion may be reduced in size. In another example, content is added from in image of the physical environment to fill in the empty space. In another example, content is filled by performing a 3D reconstruction of the content. In another example, extra spillover may be intentionally added, for example, by adding extra blocking around virtual text to improve its readability. In another example, based on the blur prediction, a de-blurring algorithm may be performed to reduce blur caused by the blocking.

Figure 8:
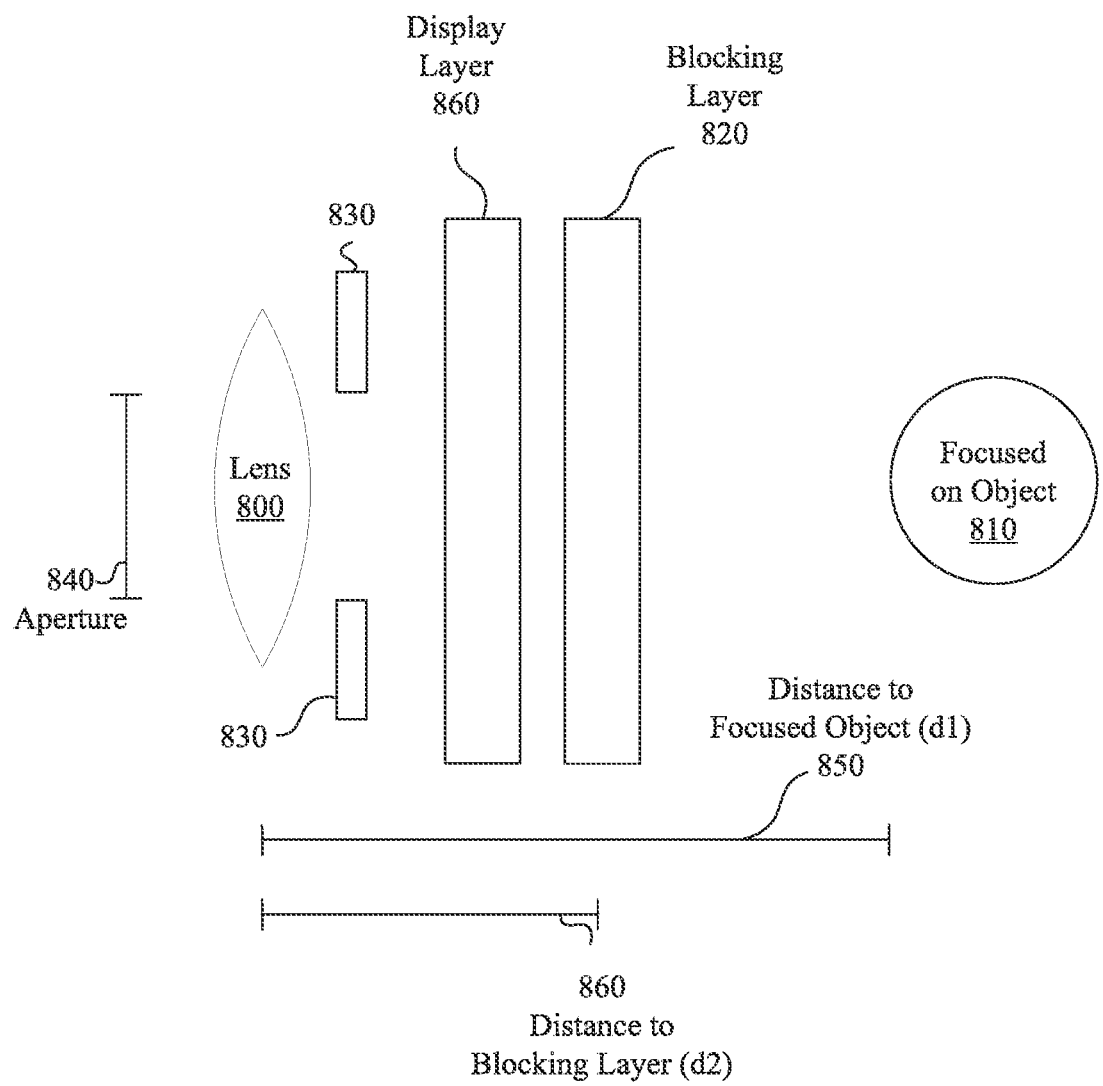
FIG. 8 is a block diagram illustrating distances between elements in a system providing a CGR environment on an optical see through HMD using selective blocking based on blur predictions.

FIG. 8 is a block diagram illustrating distances between elements in a system providing a CGR environment on an optical see through HMD using selective blocking based on blur predictions. In this example the eye includes a lens 800 that focuses the eye on focused on object 810. Light reflected from the focused on object 810 passes through the aperture structure 830 (e.g., the iris) where it encounters the lens 800 and is focused on an image plane (not shown). The focused on object 810 may actually be displayed on display layer 860 in a way that it appears to be at the location of the focused on object 810.

The HMD also includes a blocking layer 820 that blocks light reflected from the physical environment that is behind virtual objects displayed on display layer 860. In some implementations, the blocking layer 820 includes an opacity filter having a grid of pixels that can be controlled to adjust their opacity, from a minimum opacity level which allows a substantial amount of light to pass, to a maximum opacity level which allows little or no light to pass. The blocking layer is relatively close to the lens 800 and the user may experience visual anomalies when observing virtual objects on display 860 with blocking implemented behind on blocking layer 820. The virtual objects may appear blurry around the edges or have outlines. This may appear unnatural to the user. Some implementations, predict blur by determining a circle of confusion associated with the blocking layer 820 and adjust the content or blocking layer to provide a more natural or otherwise more desirable user experience.

FIG. 8 illustrates the distance to the focused object ($d_1$) 810, the distance to the blocking layer ($d_2$) 820 and the aperture 840, which in this example could correspond to the radius of the user's pupil. In some implementations, these values are used to predict the blur associated with the blocking layer 820. In some implementations, a circle of confusion is determined using the following formula.

$$C = a|1/d_1 - 1/d_2|$$

where a is aperture and C is circle of confusion.

Figure 9:
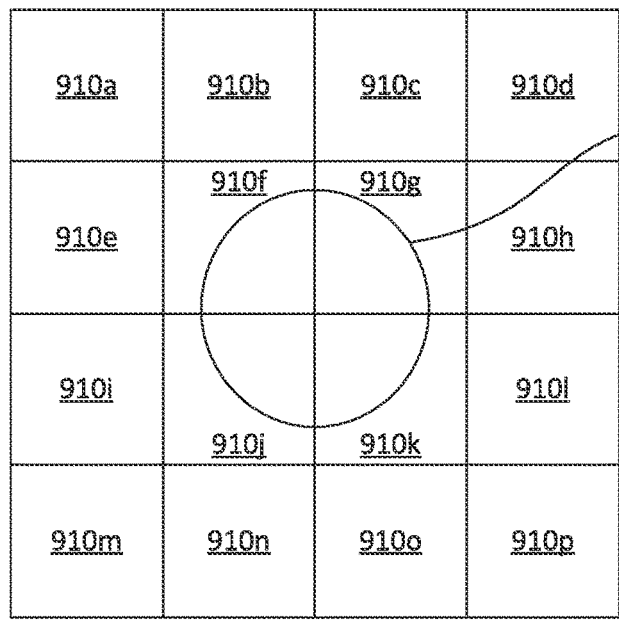
FIG. 9 is a block diagram illustrating blocking behind virtual content.
Figure 10:
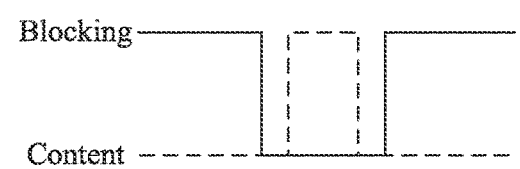
FIG. 10 is graph representing the blocking behind virtual content of FIG. 9.

FIG. 9 is a block diagram illustrating spillover of blocking behind virtual content 920. In this example, the pixels 910a-910p are selectively blocked to block light reflected from the physical environment behind the virtual content 910. Specifically, pixels 910f, 910g, 910j, and 910k block light while the other pixels allow light from the physical environment to pass through. As illustrated, the virtual content 920 is not the same size or shape as the pixels 910f, 910g, 910j, and 910k and thus the blocking spills over and the content may appear to be surrounded by empty space. FIG. 10 is graph representing the blocking behind virtual content of FIG. 9 where there are gaps between the displayed virtual content and the blocking. In this example, there is no blur associated with the blocking layer—the blocking graph shows vertical transition lines rather than sloped transition lines. If there were no blur, then the virtual content 920 and blocking layer could be aligned to start and stop at the same point. However, if there is blur, it should be taken into account in presenting the content and blocking the background light.

Implementations disclosed herein adjust the second content or blocking portion based on the predicted blur associated with the blocking layer to achieve particular advantages in different use cases and circumstances.

Figure 11:
FIG. 11 is graph representing adjusting blocking to address the blur associated with the blocking behind virtual content of FIGS. 9 and 10.

FIG. 11 is graph representing how much the blocking is predicted to blur (e.g., represented by the lines that are sloped rather than vertical). The more blur, the more the lines slope (e.g., the less vertical). In this example, the blocking and content are configured such that the blurred portion of the blocking goes up to the edge of the virtual content 920 but not over the edge of the virtual content 920. This configuration may provide an environment with sufficient blocking (e.g., avoiding overbright/transparent virtual content) while providing reduced or minimized empty areas around the virtual content 920.

Figure 12:
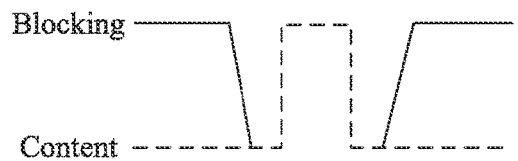
FIG. 12 is graph representing adjusting blocking to increase the spillover of blocking behind virtual content of FIGS. 9 and 10.

FIG. 12 is graph representing adjusting blocking to increase the spillover of blocking behind virtual content of FIGS. 9 and 10. In this example, the blocking is expanded to go further beyond the edges of the virtual content 920. This may be beneficial, for example, to improve the readability of text or emphasize text or other virtual content.

Figure 13:
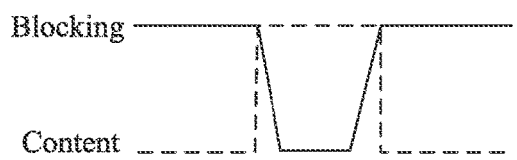
FIG. 13 is graph representing adjusting blocking and content based on blur.

FIG. 13 is graph representing adjusting blocking and content to address the spillover of blocking behind virtual content. In this example, both the blocking and the virtual content are adjusted to reduce the empty space that might otherwise surround the virtual object.

Figure 14:
FIG. 14 is graph representing adjusting blocking and content based on blur.

FIG. 14 is another graph representing adjusting blocking and content to address the spillover of blocking behind virtual content 920. In this example, both the blocking and the virtual content are adjusted to reduce the empty space that might otherwise surround the virtual content 910. Comparing FIGS. 13 and 14 illustrates how the blur (represented in the slopes of the blocking and content) can be accounted for in adjusting the virtual content 920 and blocking. The slope (which is determined based on the amount of blur) may be used to determine where to stop blocking relative to the edge of the content or how much to block (e.g., 0%, 25%, 50%, 75%, 100%) at different distances from the edge of the content.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:

at an electronic device having a processor:
determining that a user is focusing on first content represented within a computer-generated reality (CGR) environment based on an eye of the user or a user interaction with the first content;
identifying a 3D geometry of the CGR environment, wherein the 3D geometry comprises a 3D position of the first content within the CGR environment;
determining a first distance between the user and the first content that the user is focusing on in the CGR environment based on a position of the user within the CGR environment and the 3D position of the first content within the 3D geometry of the CGR environment;
determining a second distance between the user and second content, the second content comprising virtual content to be included in the CGR environment;
blurring the second content based on the first distance and the second distance; and
presenting the blurred second content in the CGR environment.

2. The method of claim 1, wherein the first content corresponds to a physical object in a physical environment depicted in the CGR environment.

3. The method of claim 1, wherein the first distance represents a distance between an eye of the user and the first content, and wherein determining the first distance comprises detecting a shape of the lens of the eye of the user based on an image of the eye of the user.

4. The method of claim 1, wherein determining the first distance comprises determining a convergence of gaze directions of eyes of the user.

5. The method of claim 1, wherein determining the first distance comprises generating a three dimensional (3D) construction of the CGR environment and identifying the first content within the 3D construction based on a gaze direction of the eye.

6. The method of claim 1, wherein the first content is virtual, wherein determining the first distance comprises identifying where the first content is intended to appear relative to an eye of the user.

7. The method of claim 1, wherein determining the second distance comprises identifying where the second content is intended to appear relative to the eye of the user.

8. The method of claim 1, wherein blurring the second content is based on determining a circle of confusion.

9. The method of claim 8, wherein the circle of confusion is determined based on the first distance, the second distance, and an aperture, wherein the aperture is determined by detecting a radius of a pupil of the user.

10. The method of claim 1, wherein the CGR environment is a virtual reality (VR) environment.

11. The method of claim 1, wherein the CGR environment is a mixed reality (MR) environment.

12. The method of claim 1, wherein the electronic device is an optical see through head-mounted device (HMD).

13. The method of claim 1, wherein the electronic device is a video pass through HMD.

14. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
determining that a user is focusing on first content represented within a computer-generated reality (CGR) environment based on an eye of the user or a user interaction with the first content;
identifying a 3D geometry of the CGR environment, wherein the 3D geometry comprises a 3D position of the first content within the CGR environment;
determining a first distance between the user and the first content that the user is focusing on in the CGR environment based on a position of the user within the CGR environment and the 3D position of the first content within the 3D geometry of the CGR environment;
determining a second distance between the user and second content, the second content comprising virtual content to be included in the CGR environment;
blurring the second content based on the first distance and the second distance; and
presenting the blurred second content in the CGR environment.

15. The system of claim 14, wherein the first distance represents a distance between an eye of the user and the first content, and wherein determining the first distance comprises:
detecting a shape of the lens of the eye of the user based on an image of the eye of the user; or
determining a convergence of gaze directions of eyes of the user; or
generating a three dimensional (3D) construction of the CGR environment and identifying the first content within the 3D construction based on a gaze direction of the eye.

16. The system of claim 15, wherein the first content is virtual, wherein determining the first distance comprises identifying where the first content is intended to appear relative to an eye of the user.

17. The system of claim 14, wherein determining the second distance comprises identifying where the second content is intended to appear relative to the eye of the user.

18. The system of claim 14, wherein blurring the second content is based on determining a circle of confusion, wherein the circle of confusion is determined based on the first distance, the second distance, and an aperture, wherein the aperture is determined by detecting a radius of a pupil of the user.

19. The system of claim 14, wherein the system comprises an optical see through head-mounted device (HMD).

20. The system of claim 14, wherein the system comprises a video pass through head-mounted device (HMD).

21. The method of claim 1 further comprising, based on the user changing focus from the first content to the second content, blurring the first content and unblurring the second content.

* * * * *